(12) United States Patent
Lively

(10) Patent No.: US 12,722,547 B2
(45) Date of Patent: Sep. 1, 2026

(54) MAGNETIC HEATED SEAT DEVICE

(71) Applicant: Sears Manufacturing Co., Davenport, IA (US)

(72) Inventor: James Burton Lively, DeWitt, IA (US)

(73) Assignee: Sears Manufacturing Co., Davenport, IA (US)

( * ) Notice: Subject to any disclaimer, the term of this patent is extended or adjusted under 35 U.S.C. 154(b) by 239 days.

(21) Appl. No.: 18/688,823

(22) PCT Filed: Sep. 9, 2022

(86) PCT No.: PCT/US2022/042990

§ 371 (c)(1),
(2) Date: Mar. 4, 2024

(87) PCT Pub. No.: WO2023/039122

PCT Pub. Date: Mar. 16, 2023

(65) Prior Publication Data

US 2024/0367562 A1 Nov. 7, 2024

Related U.S. Application Data

(60) Provisional application No. 63/243,430, filed on Sep. 13, 2021.

(51) Int. Cl.
*A47C 7/62* (2006.01)
*B29C 45/14* (2006.01)
(Continued)

(52) U.S. Cl.
CPC ...... *B60N 2/5678* (2013.01); *B29C 45/14065* (2013.01); *H05B 3/54* (2013.01);
(Continued)

(58) Field of Classification Search
CPC .. B60N 2/7017; B60N 2/5685; B60N 2/5678; B60N 2/0033; B60N 2/5891
See application file for complete search history.

(56) References Cited

U.S. PATENT DOCUMENTS

| | | | | |
|---|---|---|---|---|
| 4,559,094 | A | 12/1985 | Hostetler et al. | |
| 6,489,595 | B1 * | 12/2002 | Check .................. | B29C 66/727 219/202 |

(Continued)

FOREIGN PATENT DOCUMENTS

| | | | |
|---|---|---|---|
| CN | 102689607 | A | 9/2012 |
| KR | 101733451 | B1 | 5/2017 |

OTHER PUBLICATIONS

Korean Intellectual Property Office, Written Opinion of the International Searching Authority, dated Dec. 28, 2022, PCT/US2022/042990.

(Continued)

*Primary Examiner* — Shin H Kim
(74) *Attorney, Agent, or Firm* — Goodhue, Coleman & Owens, P.C.

(57) ABSTRACT

Disclosed is a method of placing a magnetic wire such as a magnetic heating wire into a molded vehicle seat, wherein the heating element is kept closely adjacent to the inner surface of the outer seat material of the seat during the molding process through the use of magnets in the mold. In many embodiments, the outer seat material is vinyl and the magnetic wire is an iron/chromium wire.

16 Claims, 5 Drawing Sheets

(51) Int. Cl.

| | |
|---|---|
| ***B60N 2/56*** | (2006.01) |
| ***H05B 3/54*** | (2006.01) |
| *B29K 75/00* | (2006.01) |
| *B29K 105/04* | (2006.01) |
| *B29K 705/08* | (2006.01) |
| *B29L 31/00* | (2006.01) |

(52) U.S. Cl.

CPC ...... *B29K 2075/00* (2013.01); *B29K 2105/04* (2013.01); *B29K 2705/08* (2013.01); *B29K 2995/0008* (2013.01); *B29L 2031/771* (2013.01)

(56) References Cited

U.S. PATENT DOCUMENTS

2003/0189362 A1 10/2003 Lichtinger et al.
2006/0157465 A1 7/2006 Karollus et al.
2007/0188004 A1* 8/2007 Browne .................. A47C 7/38 297/391
2008/0036110 A1* 2/2008 Brooker ................ B29C 44/351 425/388
2013/0305974 A1* 11/2013 Ishii ....................... D05B 23/00 112/475.08
2013/0307302 A1* 11/2013 Rockwell ............. B60N 2/7017 297/217.3
2013/0334202 A1* 12/2013 Li ........................ B60H 1/2227 219/541
2017/0043679 A1* 2/2017 Fukuda ................ B60N 2/0033
2017/0122719 A1* 5/2017 Fukuda .................. G01D 5/145
2019/0010301 A1* 1/2019 Ichimura .................. C08J 9/125
2020/0108768 A1* 4/2020 Ali ......................... B60K 35/60
2024/0367562 A1* 11/2024 Lively .................. B60N 2/5678
2025/0338964 A1* 11/2025 Freijy .................. B60N 2/7017
2025/0368103 A1* 12/2025 Harkleroad .......... B60N 2/5642

OTHER PUBLICATIONS

International Preliminary Report On Patentability, PCT/2022/042990, Mar. 28, 2024, 5 Pages.
International Search Report and Written Opinion, PCT/US2022/042990, Dec. 28, 2022, 6 Pages.

* cited by examiner 10
12
14
16
18
20
22
24
26
28
30
32
34
36
38
2

61
61

65
63
66

63
64

60
24
62
50
16
64

62
50
13
64

MAGNETIC HEATED SEAT DEVICE

BACKGROUND

Built-in heating elements for providing heat to seated vehicle occupants are well known. Generally the heat is provided by electric current supplied through a conductor having suitable resistivity that ensures the desired amount of heat from the conductor. The conductor, in the form of a wire, is located in a layer of textile or other material, which serves as a carrier for the heating element. The conductors (wires) are generally fixed in position on the carrier by stitching or by an adhesive. Once the conductor has been incorporated onto the carrier, the carrier is positioned between various layers of material to form the entire heating element, which is then incorporated into a seat. In this regard, the heating element in many instances is sandwiched between a top cover member of leather, fabric or plastic material and the foam rubber core portion padding of the seat.

However, for industrial seats, such as those used in farm and other heavy equipment, seats are normally fabricated utilizing an in-mold forming process. This type of process reduces costs and results in a seat made of a plastic foam, such as polyurethane foam, that is bonded to an outer decorative cover sheet or skin during the molding process. In the practice of such process, a properly shaped mold cavity is lined with a thin plastic or fabric skin after which liquid polyurethane is poured onto the skin to form an integral seat cushion or seat back. Various attempts have been made to provide a relatively inexpensive seat of this type with a heating element. For example, in previous applications, seating molds contained magnets and ferrous paint was used on the heating element to hold it in place while the foam was poured. But this paint often flaked off prior to manufacturing, resulting in poor manufacturing results which lead to higher scrap rates. Other proposed solutions include standoffs and adhesive in the seating molds to hold the heating elements in place while the rest of the foam of the seat is poured. Nevertheless, this results in both increased cost and complexity with the standoff and a layer of foam between the element and the seating material. Additionally, placing the heating element further within the foam delays the time it takes the seat to heat up. Further, the use of adhesives is often problematic because of the issues of adhesion to a large surface area. For example, the inner seat foam shrinks after the cushion is poured and using adhesion causes sink that causes the cushion to be scrapped.

SUMMARY

The present disclosure is directed to a method of making a molded heated vehicle seat, wherein the heating element of the seat is kept in place during the molding process through the use of magnetic wire. This method comprises placing an outer seat material into a seating mold with at least one magnet, positioning a heating element with at least one magnetic wire component on top of the outer seat material in the mold and filling the mold with an inner seat material. In some embodiments, the heating element includes a carrier with a reticulated open cell structure wherein the open cells are capable of being filled with the inner seat material.

Disclosed is a method of making a molded seat comprising placing an outer seat material, such as vinyl into a seating mold with at least one magnet, positioning a heating element made of a carrier and magnetic wire on an inner surface of the outer seat material in the mold; and filling the mold with an inner seat material such as seating foam. The carrier of the heating element is a reticulated open cell structure capable of being filled with the inner seat material. In many embodiments, the magnetic wire, which can be an iron/chromium wire, of the heating element is a zig-zag pattern connected to the carrier.

Also disclosed is a heated seat made from the disclosed method.

BRIEF DESCRIPTION OF THE DRAWINGS

These and other attributes of the present disclosure will become more apparent upon reference to the following specification and drawings wherein.

DETAILED DESCRIPTION

Figures 1, 2:
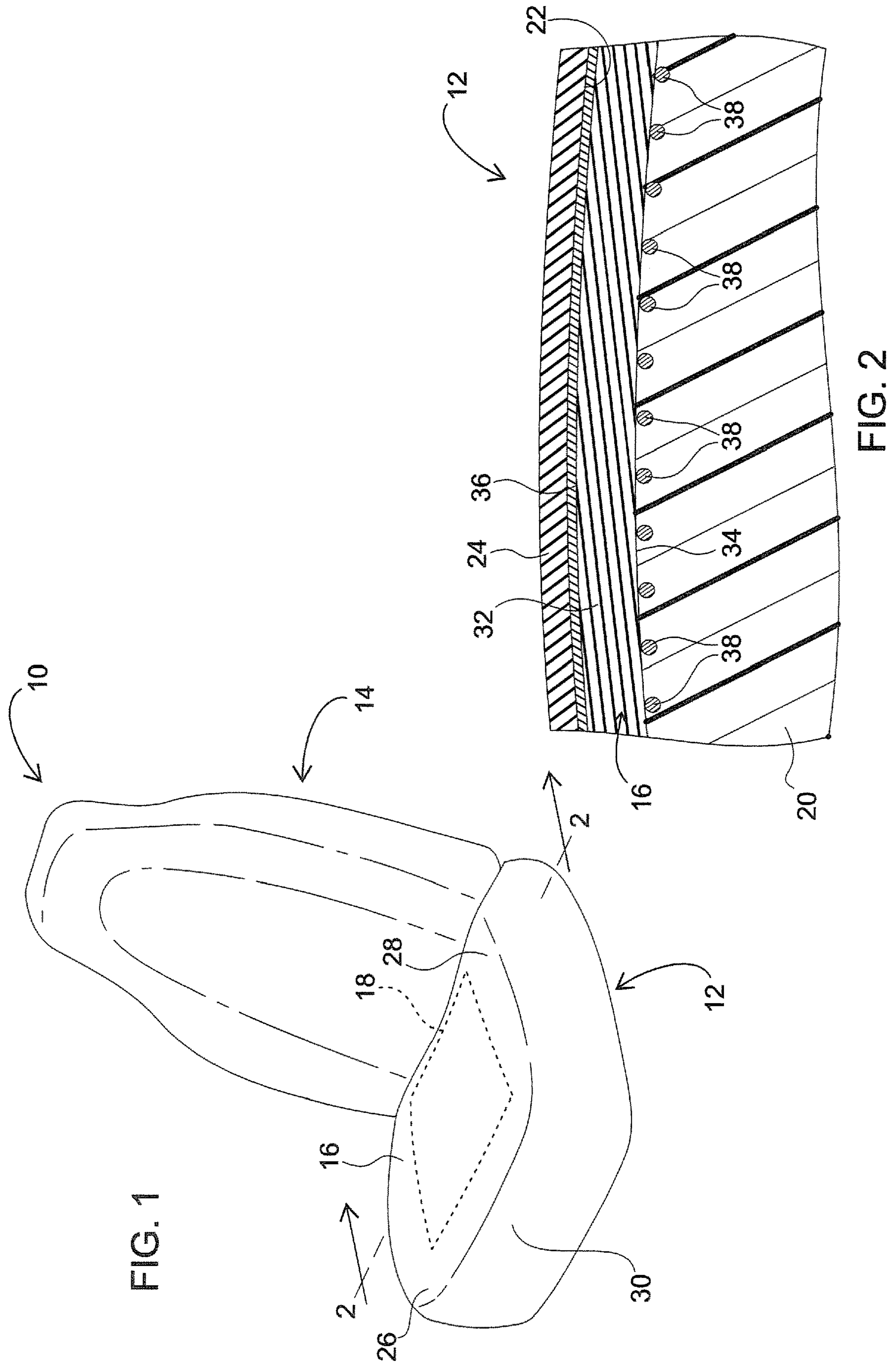
FIG. 1 is a perspective view of a molded foam seat assembly in which the seat cushion incorporates a heating element made in accordance with the present disclosure.
FIG. 2 is an enlarged cross sectional view taken on line 2-2 of FIG. 1 showing the heating element located with its electrical wires substantially uniformly spaced from the inside of the seat cushion and completely embedded within the inner seat material.

Referring to the drawings and more particularly to FIGS. 1 and 2, a vehicle seat assembly 10 is shown comprising a seat cushion 12 and a seat back 14. The seat cushion 12 includes a heating element 16 located in the support portion 18 of the seat cushion 12 and serves to heat the seat cushion. As best seen in FIG. 2, the core portion 20 of seat cushion 12 is made of inner seat material 13 such as those found in formulated polyurethane systems, i.e. high resiliency, flexible foam. In FIG. 2, inner seat material 13 is shown with heating element 16 in a fixed position in relation to the inner surface 22 of outer seat material 24. Outer seat material 24 is vinyl plastisol, vinyl drysol, butadiene styrene or other known foam impermeable material. If desired, outer seat material 24 can be a fabric material having a plastic backing so as to render it impermeable to the foam material of core portion 20 of seat cushion 12. As will be more fully described, seat cushion 12 is made in its entirety in a mold cavity, such as that demonstrated by FIG. 4. The mold cavity is configured to form seat cushion 12 with support position 18, through two raised side sections 26/28 and a raised front section 30.

Figure 3:
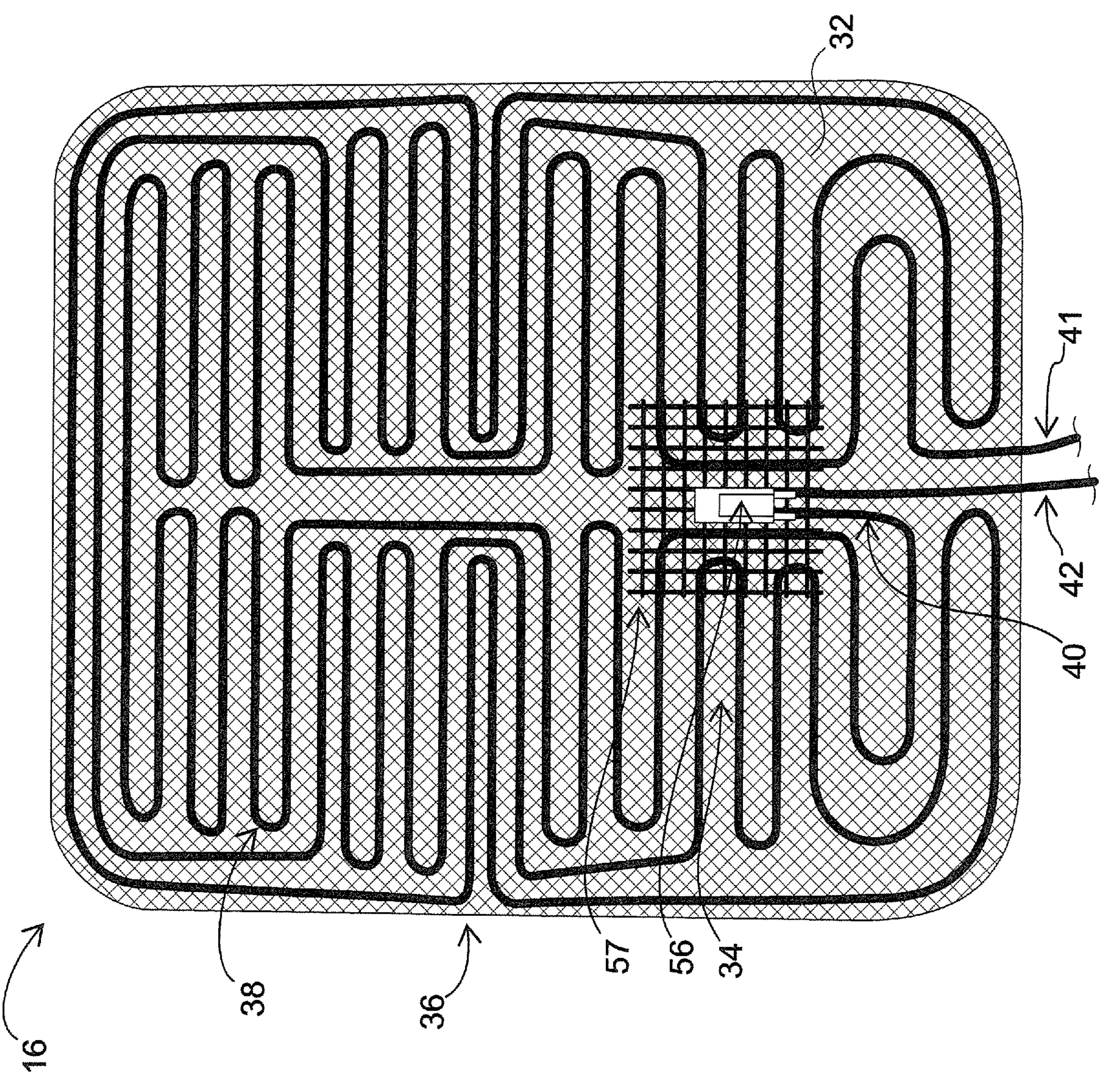
FIG. 3 is a perspective view of the heating element prior to being incorporated into the cavity of a mold for forming the seat cushion of FIG. 1.

As seen in FIG. 2, heating element 16 is embedded in its entirety within the core portion 20 of the seat cushion 12 in the area of support portion 18. More specifically and as seen in FIG. 3, heating element 16 comprises a carrier 32 in the form of a net-like reticulated foam having a network of open cells throughout its entire flexible body. Carrier 32 has a pair of spaced parallel surfaces, namely, an upper planar surface 34 and a lower planar surface 36. The upper planar surface 34 fixedly supports electric wire 38 which has a pair of ends 40 and 41, end 40 is connected by a connector to thermostat 56. End 41, and thermostat wire 42 are connected by a connector to conductors located in an electric cable 50. With the exception of end 40, end 41, and thermostat wire 42, which are glued to carrier 32, electric wire 38 in heating element 16 is fixed to carrier 32 by sewing the wire to carrier 32. In many cases, this will be done by a CNC sewing machine. However, in some embodiments, hot melt adhesive may be used to fix electric wire 38 to carrier 32 using a spray gun or other method. If using adhesive to fix electric wire 38 to carrier 32 to form heating element 16, the important consideration is to have the adhesive dry relatively quickly and serve to join the electric wire 38 to the web portions of carrier 32 in an open cell type bond which does not restrict the flow of the inner seat material 13 into the interior of carrier 32 during the molding of seat cushion 12.

As shown most clearly in FIG. 3, in one embodiment, electric wire 38 is arranged in a zig-zag pattern so as to cover most of the area of the upper planar surface 34 of carrier 32. Nevertheless, this arrangement is not meant to be limiting and other wire arrangements, such as longitudinal zig zag or electrical wires forming individual squares or rectangles are contemplated. The embodiment in FIG. 3 is demonstrated as a rectangular shape. Nevertheless, other shapes such as trapezoid type shapes are envisioned.

Although not meant to be limiting, in one embodiment, heating element 16 of carrier 32 of seat cushion 12 is generally uniform thickness measuring approximately one quarter inch (the distance between surfaces 34 and 36). However, different carriers, such as those with different ohm values, wire lengths, wire material, or wire strand count are contemplated. Generally a carrier is anticipated as long as it meets the desired watt/density for either 12*v* or 24*v* applications. In most applications, electric wire 38 used with heating element 16 should have a 226 plus-or-minus 5% Ohm/km with an operating temperature of −30 degrees Centigrade to plus 105 degrees Centigrade.

In most embodiments, electric wire 38 in heating element 16 is magnetic wire. Generally this will be a nickel/chromium wire. However, neither the diameter of the wire nor the material are meant to be limiting. For example, the wire of heating element 16 could be iron/chromium, copper/nickel, etc. In another embodiment, the heating component of heating element 16 will be made from non-magnetic wire but a non-heating magnetic wire will be added. Also, rather than using wires, electrically conductive pure carbon elements, which could be secured to the upper planar surface 34 of the carrier 32 could be substituted. The only requirement is that heating element 16 have at least one magnetic component capable of attraction to the magnet(s) within seat mold 60.

Seat assembly may also include a thermostat 56 on the upper surface 34 of carrier 32 to sense the temperature of heating element 16. Thermostat 56 controls when electric wire 38 is energized so as to provide a substantially uniform heat to the occupant of seat assembly 10. Electric cable 50 connects electrically through a control with the electrical power of the vehicle so as to provide electricity to both electric wire 38 and thermostat 56 when the occupant of the seat assembly 10 desires a heated seat. As shown in the embodiment of FIG. 3, thermostat 56 is attached to thermostat carrier 57. Thermostat carrier 57 can be made from stiff wire, such as the example in the figure. It can also be made from other materials. Thermostat carrier 57 just needs to be compatible with the other seat materials and able to provide a stable attachment for thermostat 56. In certain embodiments, thermostat carrier 57 will not be used.

As mentioned above, heating element 16 is embedded within core portion 20 of seat cushion 12 closely adjacent to the inner surface 22 of the outer seat material 24. When the seat is being formed, heating element 16 is held in place in seat mold 60 on inner surface 22 of outer seat material 24.

Figure 4:
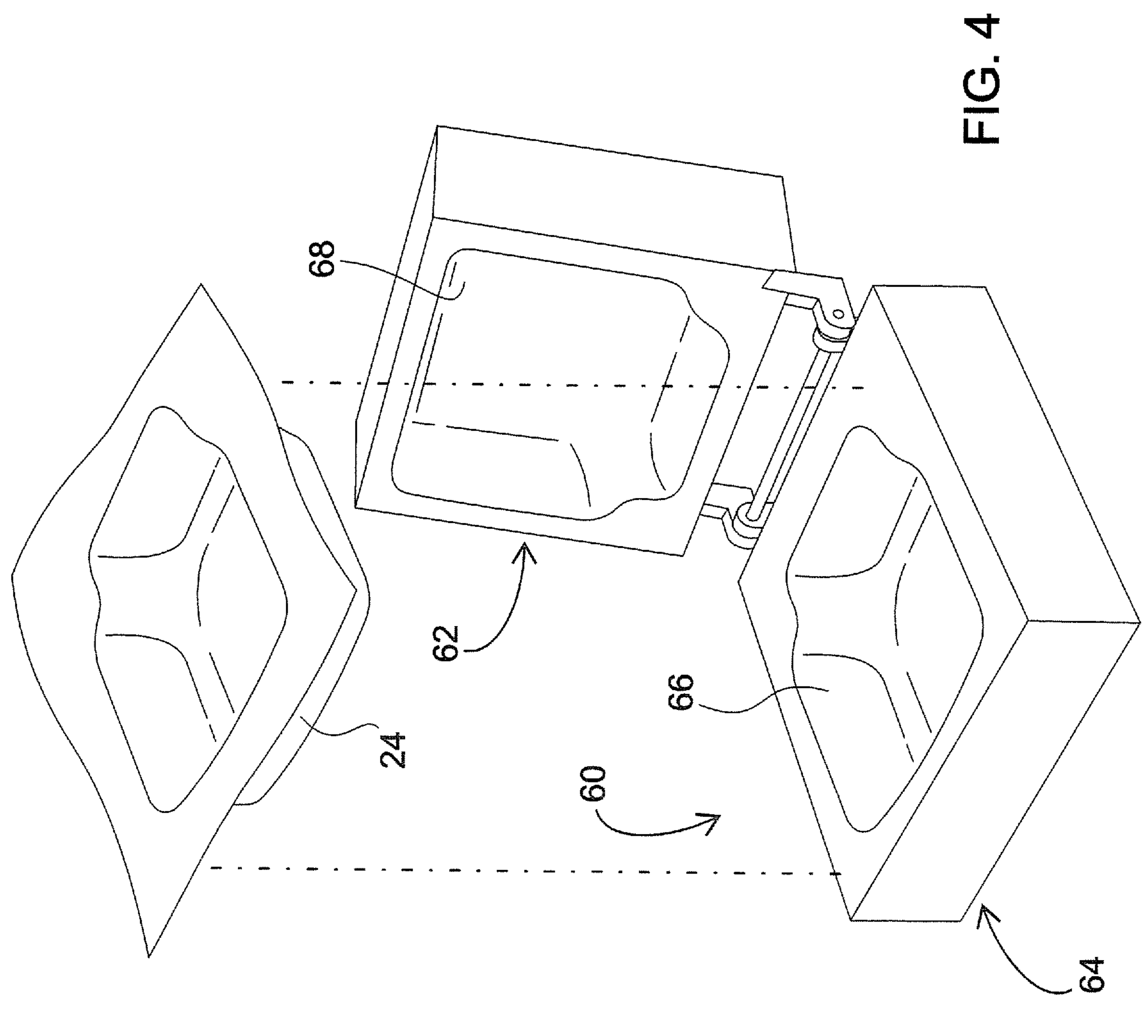
FIG. 4 is a perspective view of a mold having a lower mold portion and an upper mold portion used in forming the seat cushion of the seat assembly of FIG. 1.

An example two piece seat mold 60, is demonstrated in FIG. 4. This mold comprises an upper mold portion 62 and a lower mold portion 64. The lower mold portion 64 is formed with a cavity 66 which conforms in shape to the upper part, as seen in FIG. 1, of the seat cushion 12 while the upper mold portion 62 is provided with a cavity 68 which conforms to the bottom part of the seat cushion 12. The upper mold portion 62 is pivotally connected to lower mold portion 64 and is adapted to pivot downwardly onto lower mold portion 64 such that cavities 66 and 68 of the upper and lower mold portions 62 and 64, respectively, register with each other.

Figures 5, 6:
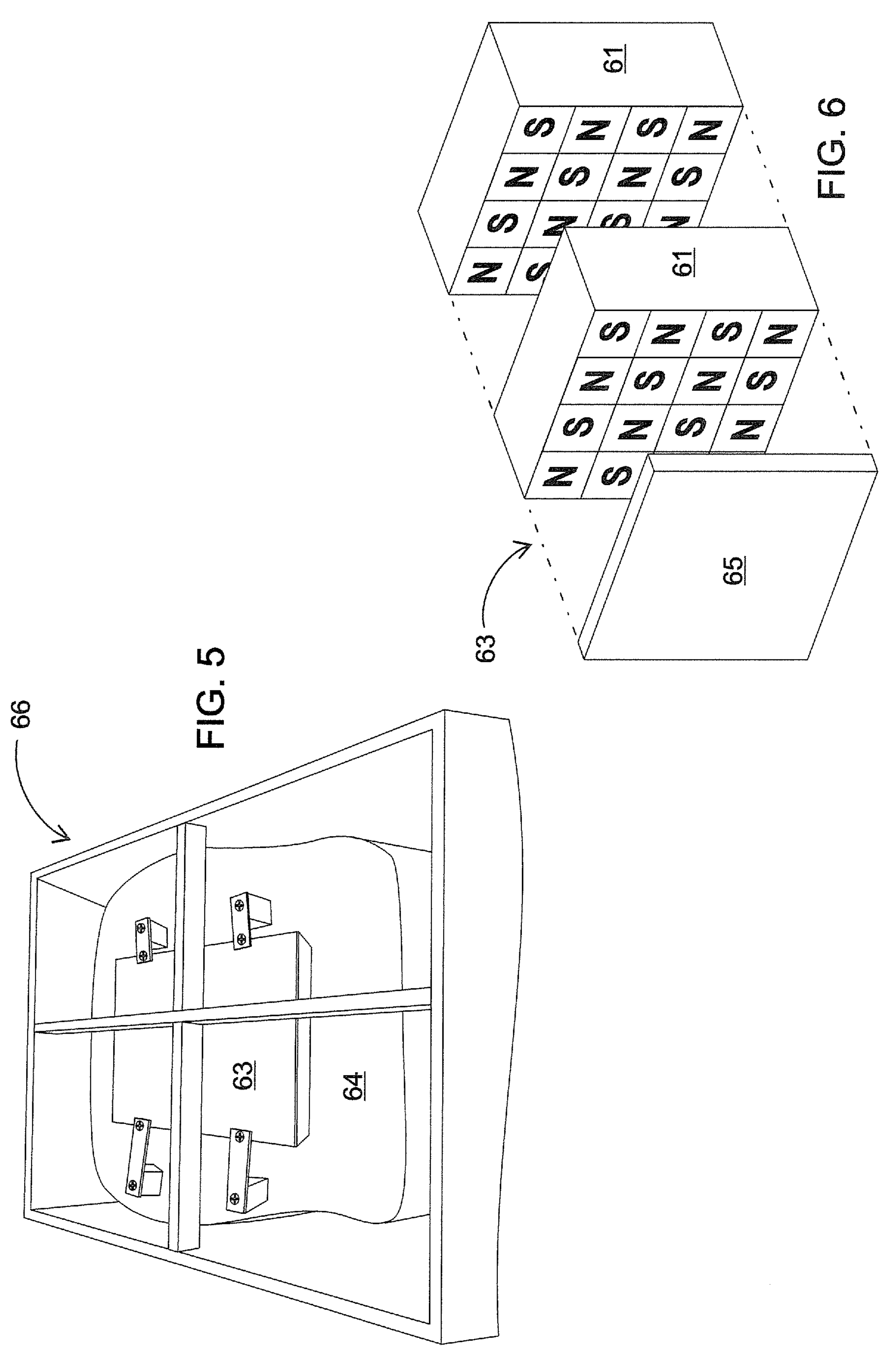
FIG. 5 is a perspective view of a magnet grid within the cavity of the lower mold portion.
FIG. 6 is an enlarged view of the magnet grid of the disclosed embodiment.

As demonstrated by FIG. 5, cavity 66 has one or more magnets 61 built into its surface. These magnets allow heating element 16 to be held into place when inner seat material 13, such as foam, is inserted into the mold to create the seat. An example magnet grid 63 in lower mold portion 64 is shown in FIG. 6. In this embodiment, individual magnets are 2"×2"×1" with two layers of magnets. Each layer has sixteen square shaped individual magnets. The size, shape and number of individual magnets in magnet grid 63 is not meant to be limiting and can change with different seating applications. In many cases, there is also a plate 65 on one side of the grid to assist in directing polarity. The embodiment of FIG. 6 demonstrates a ¼ inch steel plate.

Figures 7, 8:
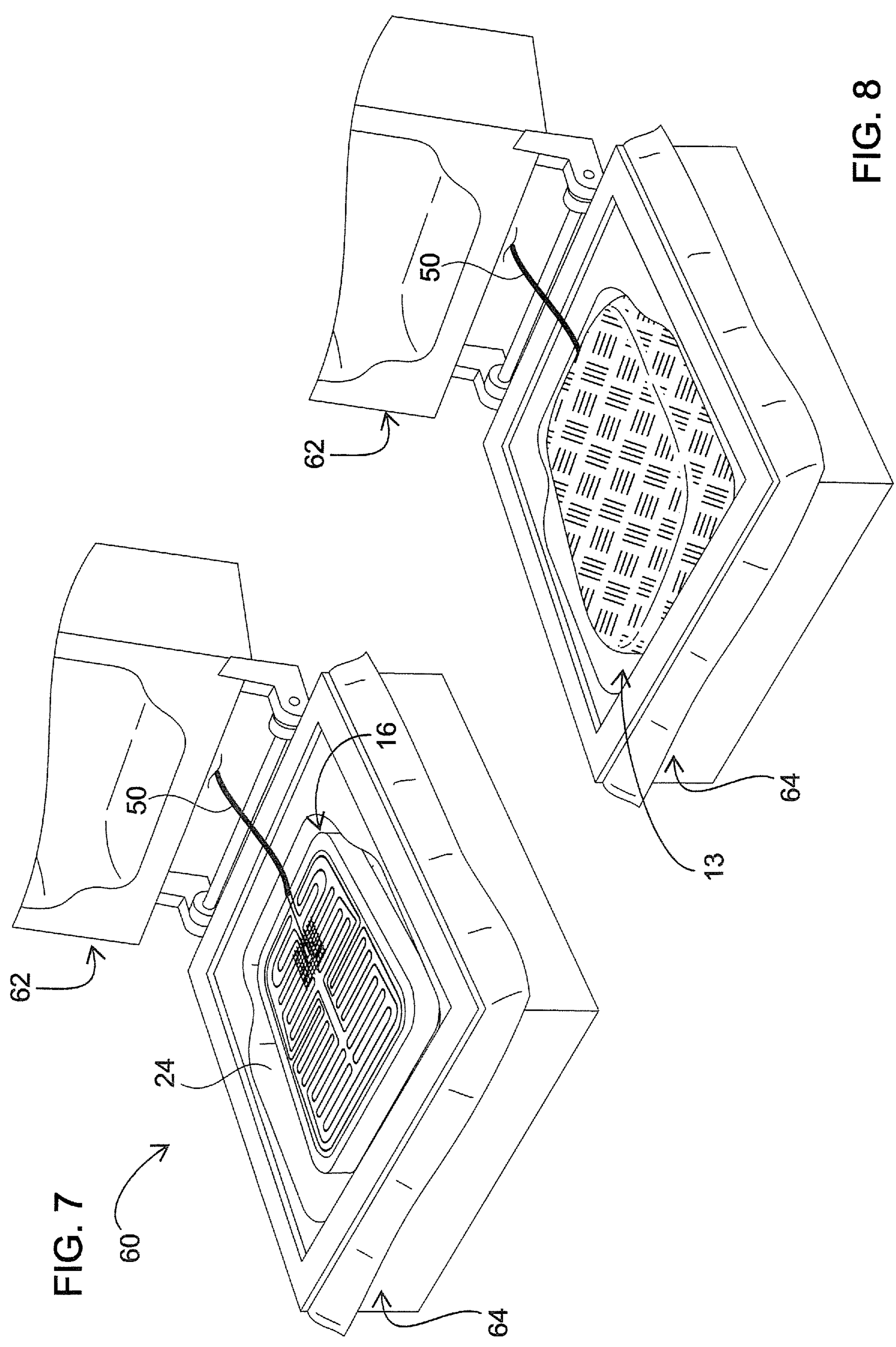
FIG. 7 shows the pre-formed outer seating material of the seat cushion located within the lower mold portion and also shows the heating element of FIG. 3 located within the cavity of the lower mold portion prior to the pouring of the inner seat material into the mold.
FIG. 8 shows inner seat material covering the heating element prior to the closing of the mold after which the mold is closed and the inner seat material is molded to form the seat cushion of FIG. 1.

Prior to closing the seat mold 60, outer seat material 24, such as described above, is initially pre-formed so as to have the configuration of the seat cushion 12. Pre-forming of materials of this type is well known to those skilled in the art of in-place molding of articles. Once outer seat material 24 is preformed as seen in FIG. 7, outer seat material 24 is positioned on the lower mold portion 64. Outer seat material 24 can be held in lower mold portion 64 through the use of vacuum. Once outer seat material 24 has been fixed inside the mold, heating element 16 is then placed in the area of support portion 18. The magnet grid within seat mold 60, such as shown in FIG. 5, holds heating element 16 in a fixed position relative to the inner seat material. Magnet strength must accomplish holding the heating element as firmly and as close to the inner seat material as possible during the foaming process. An example magnet is a rare earth neodymium magnet.

As demonstrated by FIG. 7, inner seat material 13 such as liquid urethane foam material or another appropriate liquid seat foam material is then poured into lower mold portion 64 to cover the heating element 16 such that the entire exposed portion of heating element 16 is encapsulated within inner seat material 13. Cable 50 is positioned as seen in FIG. 8 so that it extends out of seat mold 60 when seat mold 60 is closed. This is followed by having upper mold portion 62 pivoted downwardly to close the seat mold 60 such that inner seat material 13 expands and cures to form the seat. Seat mold 60 is then opened, the cured article removed from the lower mold portion 64, and the extremities of outer seat material 24 are trimmed so as to provide a seat cushion 12 such as that seen in FIG. 1. Inasmuch as heating element carrier 32 contains a multiplicity of open cells interconnected by thin web sections, inner seat material 13 expands within the cells of heating element carrier 32. This results in heating element carrier 32 effectively becoming a solid spacer with electric wire 38 permanently substantially uniformly spaced from inner surface 22 of the outer seat material 24.

The lack of tape or scrim when assembling heating element 16 into the inner seat material 13 allows heating element 16 to substantially conform to the shape of the seat occupant. Thus, heating element carrier 32 can stretch, move laterally and downwardly together with inner seat material 13 when the weight of the occupant is applied to support portion 18 of seat cushion 12. This provides a softness to support portion 18, thus, permitting the seat occupant to have a comfortable seating effect without detecting any hardness in the support portion 18 of the seat cushion 12.

In a different embodiment, outer seat material 24 will be a fabric material backed with a plastic coating that renders the fabric impermeable to inner seat material 13. Similarly to other outer seat materials, fabric material is pre-formed to provide the configuration of the seat cushion, placed in a mold, heating element 16 is positioned in the mold as described above, and inner seat material 13 is added and allowed to cure as described above.

In the above description, heating element 16 is shown as being incorporated only in seat cushion 12 of the seat assembly 10. However, it should be apparent to the skilled artisan that heating element 16 can equally as well be incorporated into seat back 14 and have seat back 14 formed utilizing a process such as described in connection with seat cushion 12.

EMBODIMENTS

Embodiment 1. A method of making a molded seat comprising:

- Placing an outer seat material into a mold wherein the mold has at least one magnet;
- Positioning a heating element on an inner surface of the outer seat material in the mold wherein the heating element has at least one magnetic wire component; and
- filling the mold with an inner seat material.

Embodiment 2. The method of Embodiment 1, wherein the heating element comprises a carrier and an electric wire connected to the carrier, further wherein the carrier comprises two spaced planer surfaces with a reticulated open cell structure between the two spaced planer surfaces, wherein the open cells are capable of being filled with the inner seat material.

Embodiment 3. The method set forth in Embodiment 2, wherein the electric wire is connected to the carrier in a zig-zag pattern onto at least one surface of the carrier.

Embodiment 4. The method of Embodiments 1-3, wherein the heating element further comprises a thermostat.

Embodiment 5. The method of Embodiments 2-4, wherein the electric wire further comprises two ends, wherein the two ends are connected to two conductors within a cable.

Embodiment 6. The method of Embodiments 1-5, wherein the outer seating material is vinyl.

Embodiment 7. The method of Embodiments 1-6, wherein the inner seating material is a plastic foam.

Embodiment 8. The method of Embodiment 7, wherein the plastic foam is a polyurethane foam.

Embodiment 9. The method of Embodiments 2-8, wherein the at least one electric wire is at least one magnetic wire.

Embodiment 10. The method of Embodiment 9, wherein the at least one magnetic wire is an iron/chromium wire.

Embodiment 11. The method of Embodiments 1-10, wherein the at least one magnet is a Rare earth neodymium magnet.

Embodiment 12. The method of Embodiments 1-11 further comprising closing the mold and allowing the seat to cure.

Embodiment 13. A heated seat comprising:

- An outer seat material;
- An inner seat material within the outer seat material; and
- A heating element positioned within the inner seat material, wherein the heating element comprises at least one magnetic wire.

Embodiment 14. The heated seat of Embodiment 13, wherein the seat is made using a molding process.

Embodiment 15. The heated seat of Embodiments 13-14, wherein the at least one magnetic wire is an iron/chromium wire.

Embodiment 16. The heated seat of Embodiments 13-15, wherein the heating element further comprises a carrier, wherein the carrier comprises two spaced planer surfaces with a reticulated open cell structure between the two spaced planer surfaces, wherein the open cells are capable of being filled with the inner seat material and further wherein the at least one magnetic wire is connected to the carrier in a zig-zag pattern onto at least one surface of the carrier.

Embodiment 17. The heated seat of Embodiments 13-16, wherein the outer seat material is vinyl.

It should be understood that this disclosure is, in many respects, only illustrative. Changes may be made in details, particularly in matters of shape, size, and arrangement of steps without exceeding the scope of the invention. The invention's scope is, of course, defined in the language in which the appended claims are expressed.

What is claimed is:

1. A method of making a molded seat comprising:

- placing an outer seat material into a mold wherein the mold has at least one magnet;
- positioning a heating element on an inner surface of the outer seat material in the mold wherein the heating element has at least one magnetic wire component; and
- filling the mold with an inner seat material;
- wherein the heating element comprises a carrier and an electric wire connected to the carrier, further wherein the carrier comprises two spaced planar surfaces with a reticulated open cell structure between the two spaced planar surfaces, wherein the open cells are capable of being filled with the inner seat material.

2. The method set forth in claim 1 wherein the electric wire is connected to the carrier in a zig-zag pattern onto at least one surface of the carrier.

3. The method of claim 1 wherein the heating element further comprises a thermostat.

4. The method of claim 1 wherein the electric wire further comprises two ends, wherein the two ends are connected to two conductors within a cable.

5. The method of claim 1 wherein the outer seating material is vinyl.

6. The method of claim 1 wherein the inner seating material is a plastic foam.

7. The method of claim 6 wherein the plastic foam is a polyurethane foam.

8. The method of claim 1 wherein the at least one electric wire is at least one magnetic wire.

9. The method of claim 8 wherein the at least one magnetic wire is an iron/chromium wire.

10. The method of claim 1 wherein the at least one magnet is a rare earth neodymium magnet.

11. The method of claim 1 further comprising closing the mold and allowing the seat to cure.

12. A heated seat comprising:

an outer seat material;

an inner seat material within the outer seat material; and a heating element positioned within the inner seat material, wherein the heating element comprises at least one magnetic wire and a carrier, wherein the carrier comprises two spaced planar surfaces with a reticulated open cell structure between the two spaced planar surfaces, wherein the open cells are capable of being filled with the inner seat material and further wherein the at least one magnetic wire is connected to the carrier in a zig-zag pattern onto at least one surface of the carrier.

13. The heated seat of claim 12 wherein the seat is made using a molding process.

14. The heated seat of claim 12 wherein the at least one magnetic wire is a chromium/nickel wire.

15. The heated seat of claim 12 wherein the outer seat material is vinyl.

16. A heated seat assembly comprising:

an outer seat material;

an inner seat material disposed within the outer seat material;

a heating element comprising a carrier and at least one magnetic wire component connected to the carrier, wherein the carrier comprises two spaced planar surfaces with a reticulated open cell structure between the two spaced planar surfaces, wherein the open cells are at least partially filled with the inner seat material; and wherein the heated seat assembly is formed by a molding process in which a mold having at least one magnet magnetically attracts and retains the at least one magnetic wire component of the heating element against an inner surface of the outer seat material while the inner seat material is introduced into the mold.

* * * * *